No. 866,451. PATENTED SEPT. 17, 1907.
W. L. FORAKER & H. WALKER.
NUT LOCK.
APPLICATION FILED JUNE 15, 1907.
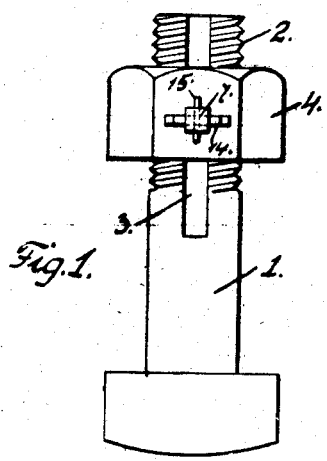
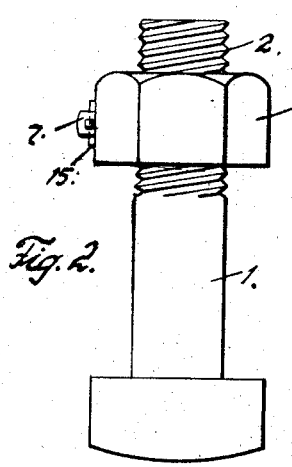
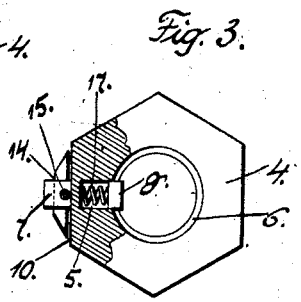
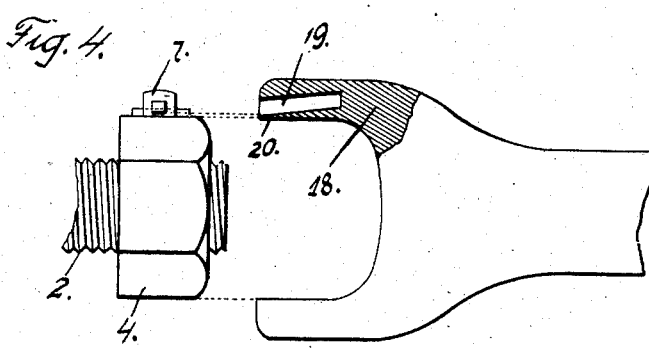
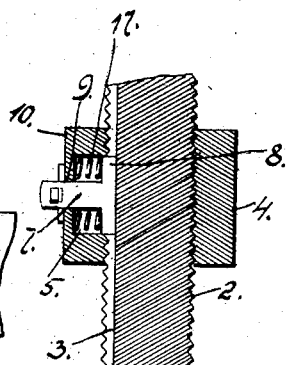
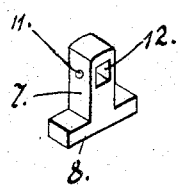
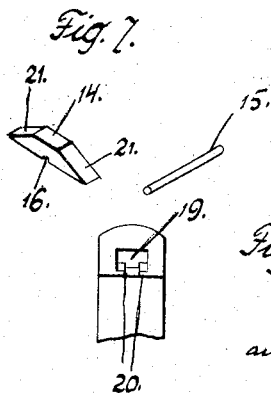
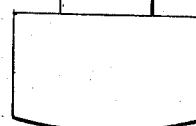
WITNESSES:
A. H. Rabsag,
K. H. Butler.
Inventors:
William L. Foraker
and Homer Walker,
By H. C. Everett & Co.
Attorneys

UNITED STATES PATENT OFFICE.

WILLIAM L. FORAKER AND HOMER WALKER, OF BYESVILLE, OHIO.

NUT-LOCK.

No. 866,451.  Specification of Letters Patent.  Patented Sept. 17, 1907.

Application filed June 15, 1907. Serial No. 379,174.

*To all whom it may concern:*

Be it known that we, WILLIAM L. FORAKER and HOMER WALKER, citizens of the United States of America, residing at Byesville, in the county of Guernsey and State of Ohio, have invented certain new and useful Improvements in Nut-Locks, of which the following is a specification, reference being had therein to the accompanying drawing.

This invention relates to nut locks, and the invention has for its object the provision of positive and reliable means in connection with a nut for firmly retaining the same upon the threaded end of a bolt, whereby it cannot become accidentally disengaged from the bolt.

Our nut lock is particularly designed for rail joints and such structures where the bolts and nuts are subjected to vibrations, which tend to loosen a nut upon a bolt and cause the same to become disengaged from the bolt.

In connection with our improved nut lock we use a novel wrench for releasing a nut from a bolt, should it be necessary to remove a nut.

The detail construction entering into our invention will be presently described, and then specifically pointed out in the appended claims.

In the drawing, Figure 1 is a plan of a nut lock, constructed in accordance with our invention. Fig. 2 is an elevation of the same. Fig. 3 is a front elevation of the nut partly in section. Fig. 4 is an elevation of the nut and a part of the bolt, also showing a portion of a wrench used in connection with the nut lock. Fig. 5 is a longitudinal sectional view of a bolt having a nut lock thereon. Fig. 6 is a detached detail perspective view of one of the elements of the locking member. Fig. 7 is a similar view of detail parts thereof, and Fig. 8 is an end view of a portion of a wrench.

In the drawings, the reference numeral 1 designates a bolt having a threaded end 2 provided with a longitudinally disposed slot 3.

Upon the bolt 1 is threaded a nut 4 having a recess 5 formed therein intersecting the thread 6 of the nut. In the recess 5 is mounted a locking member 7 substantially T-shape in form, the head 8 of which is adapted to engage in the groove 3 of the bolt 1. The end of the locking member protrudes through an opening 9 formed in the face of the nut and extends beyond the face 10 of said nut. The member is provided with two transversely-disposed openings 11 and 12 arranged at right angles to one another. Mounted in the opening 12 is a block 14, which is held therein by a pin 15, passing through the opening 11 and a groove 16 formed in the under face of the block 14.

Coil springs 17 are mounted in the recess 5 for normally holding the head 8 in an extended position or in the groove 3 of the bolt 1, said springs also holding the ends of the pin 15 in engagement with the face 10 of the nut. In positioning the pin below the block 14 in the member 7, I prevent the ends of the block from engaging the face of the nut, thus permitting of an instrument being inserted under the ends of the block, to elevate the locking member and release the nut 4 upon the bolt. Such an instrument conforms to the wrench illustrated in Figs. 4 and 8 of the drawings, wherein one of the jaws 18 of the wrench is grooved, as at 19, to fit over the protruding end of the locking member 7. In grooving the jaw 18, two diametrically opposed flanges 20 are formed, adapted to pass under the tapering ends 21 of the block 14. The groove 19 is formed at an inclination whereby as the wrench engages the block 14, the locking member 7 will be gradually elevated as the ends of the block 14 ride upwardly upon the flanges 20 of the jaw of the wrench.

It is thought that the construction and operation of the nut lock will be apparent from the foregoing description taken in connection with the drawings, and we desire it to be further understood that the locking member and its appurtenant parts can be made of any desired size and used in connection with various types of nuts.

What we claim and desire to secure by Letters Patent is:—

In a nut lock, a bolt provided in its threaded portion with a longitudinally-disposed groove, a nut fitting on said bolt and having a recess in one side communicating with the central opening of the nut, said nut having an opening through one face registering with said recess, a substantially T-shaped locking member mounted in the recess with its head lying within the groove of the bolt and its shank extending through the opening in the nut and provided with a pair of openings extending transversely through said shank at right angles to each other, a block extending through one of said openings having a groove in its underneath face, a pin extending through the other of said openings and engaging in the groove of said block to lock the latter within the shank, substantially as described.

In testimony whereof we affix our signatures in the presence of two witnesses.

WILLIAM L. FORAKER.
        HOMER WALKER.

Witnesses:
 ALVAH B. FLOOD,
 ROY T. FORAKER.